United States Patent [19]

Lindner et al.

[11] 4,157,990

[45] Jun. 12, 1979

[54] LUBRICATING AND ANTI-TACK COMPOSITIONS USEFUL IN THE SHAPING OF THERMOPLASTICS CONTAINING MIXED ESTERS AND ESTERS OF $C_{32-72}$ MONOALCOHOLS WITH $C_{18-72}$ MONOACIDS

[75] Inventors: Robert A. Lindner, Newburgh, N.Y.; Edwin M. Smolin, Kinnelon, N.J.

[73] Assignee: Henkel Inc., Teaneck, N.J.

[21] Appl. No.: 867,487

[22] Filed: Jan. 6, 1978

Related U.S. Application Data

[63] Continuation of Ser. No. 656,810, Feb. 10, 1976, abandoned.

[51] Int. Cl.$^2$ .............................................. C10M 1/24
[52] U.S. Cl. ................... 252/56 S; 260/31.6; 260/31.8 R; 260/31.8 W; 526/5
[58] Field of Search ................. 252/56 S, 56 R, 56 D, 252/57

[56] References Cited

U.S. PATENT DOCUMENTS

| | | | |
|---|---|---|---|
| 3,194,791 | 7/1965 | Wilson et al. | 252/56 S X |
| 3,252,909 | 5/1966 | Jenks | 252/56 S X |
| 3,413,223 | 11/1968 | Forbes et al. | 252/56 S X |
| 3,637,501 | 1/1972 | Malec et al. | 252/57 |
| 3,875,069 | 4/1975 | Worschech et al. | 252/56 S |

*Primary Examiner*—Delbert E. Gantz
*Assistant Examiner*—Andrew Metz
*Attorney, Agent, or Firm*—Hammond & Littell

[57] ABSTRACT

Mixtures of (A) mixed esters of (a) $C_{2-10}$ alkanepolyols, (b) certain dicarboxylic acids, and (c) $C_{12-30}$ aliphatic hydrocarbon monocarboxylic acids, said esters having hydroxyl and acid numbers of 0 to 6 and having a molecular weight above 524, and (B) esters of $C_{32-72}$ aliphatic monools with $C_{18-72}$ aliphatic hydrocarbon monocarboxylic acids (the weight ratio of A to B being between 9:1 and 1:3) are useful as lubricants and detackifiers in thermoplastic molding compositions.

9 Claims, No Drawings

LUBRICATING AND ANTI-TACK COMPOSITIONS USEFUL IN THE SHAPING OF THERMOPLASTICS CONTAINING MIXED ESTERS AND ESTERS OF $C_{32-72}$ MONOALCOHOLS WITH $C_{18-72}$ MONOACIDS

This application is a continuation of Ser. No. 656,810, filed Feb. 10, 1976, and now abandoned.

THE PRIOR ART

The production of shaped articles of thermoplastic material is done according to known methods, such as calendering, pressing, continuous casting, or extruding at elevated temperature. The known processing techniques result in many technical problems for which many solutions have been suggested, such as by adding various aids to the plastics.

A great number of lubricants suggested so far for use in the shaping of thermoplastic materials primarily impart to these materials an improved fluidity. Examples of lubricants previously used include paraffins of various molecular weights and degrees of branching; fatty alcohols, naturally occurring and synthetic; higher molecular aliphatic monocarboxylic acids as well as amides derived from them; and metal soaps and simple esters. Examples of naturally occurring esters include carnauba wax and beeswax, while examples of synthetically produced esters which have been used include ethyl palmitate, butyl stearate, octyl stearate, ethylene glycol monostearate, ethylene glycol distearate, and glycerin monooleate. Esters of polycarboxylic acids with long-chain aliphatic monovalent alcohols, for example, dioctylsebacate, have also been suggested as lubricants for molding thermoplastic masses based on the polyamides.

Lubricants known up to now, and particularly the products derived from long-chain aliphatic carboxylic acids, impart an improved fluidity to the thermoplastic materials during the shaping operation, but they do not prevent to a sufficient extent the sticking of the thermoplastics to the hot metal parts of the processing machines. Lubricants which impart an improved fluidity to the thermoplastic masses being processed are referred to as "internal lubricants." Lubricants designed to prevent the sticking of thermoplastic masses to hot metal parts of processing machines are referred to as "external lubricants." An advantage of the above-mentioned internal lubricants is that they are highly compatible with thermoplastic materials such as polyvinyl chloride, polystyrene, vinyl chloride copolymers and styrene copolymers, and they do not impair the transparency of the thermoplastics, or hinder the further processing of semifinished products by welding, pressing, cementing or similar steps. However, the presence of large proportions of these lubricants in thermoplastic compositions, even when not large enough to result in moldings which are opaque or of impaired transparency, may cause a considerable decrease in the dimensional stability under heat of the moldings or may result in considerable and undesirable decreases in other mechanical properties.

Lubricants are also known which are particularly useful with chlorinated polymers such as polyvinyl chloride and which impart satisfactory non-stickiness during the shaping step. Thus combinations of paraffins with silicone oils have been suggested as such external lubricants. Such types of compounds impart a sufficient non-stickiness during the shaping process, but they sweat out to form a closed coating film on the surface of the shaped semi-finished or finished product which makes subsequent treatments (such as welding, cementing, printing, varnishing, etc.) very difficult if not impossible. This sweating effect takes place even after very small additions of lubricants, for example, 0.1%.

Further examples of this type of external lubricants include esters of extremely long-chain fatty acids, such as montanic acid or mixed esters from dicarboxylic acids, aliphatic polyols and aliphatic long-chain monocarboxylic acid. The non-stickiness of these last-mentioned lubricants depends on the concentration; and it requires that substantial additions be made to the polymer to be processed, in order to achieve optimum non-stickiness without causing harmful incompatibilities. Even with small additions of lubricants, in specific cases under 0.1 part by weight per 100 parts by weight of the chlorinated polymer, opacities and other incompatibility phenomena appear. It is, therefore, frequently impossible to avoid incompatibilities at the minimum concentration of the lubricant determined by the processing method and the processing temperature, and it is frequently impossible to obtain a clear glasslike, weldable and printable end product by reducing the lubricant concentration. The problem was, therefore, to achieve the positive benefits of the last-mentioned mixed esters in preventing the sticking of the plastic compounds to the hot parts of the processing machines, even in such low concentrations that no opacities or other incompatibility phenomenon would appear, and with no more than a negligible amount of sweating out of the lubricant.

Worschek U.S. Pat. No. 3,875,069 discloses that thermoplastic molding compositions which contain a very minor amount (0.1% to 5% by weight) of a complex mixture of substantially neutral esters are greatly improved as to their mold release properties in that the ester mixture provides the molding composition with increased fluidity and decreased adhesiveness or "tack" towards steel at the molding temperatures.

OBJECTS OF THE INVENTION

An object of the invention is to provide a lubricating and anti-tack composition for use in thermoplastic molding compositions.

A further object of the invention is the development of a lubricant composition and anti-tack agent useful in the shaping of thermoplastic material comprising (A) mixed esters with hydroxyl and acid numbers of 0 to 6 of (a) alkanepolyols having 2 to 6 hydroxyl groups and 2 to 10 carbon atoms, (b) a dicarboxylic acid selected from the group consisting of aliphatic hydrocarbon dicarboxylic acids having 2 to 22 carbon atoms, cycloalkanedicarboxylic acids of 5 to 10 carbon atoms, aromatic hydrocarbon dicarboxylic acids of 8 to 14 carbon atoms, and the mixtures thereof, and (c) aliphatic hydrocarbon monocarboxylic acids having 12 to 30 carbon atoms, said mixed esters having a molecular weight of at least 524, and (B) esters of aliphatic monofunctional alcohols having 32 to 72 carbon atoms and aliphatic hydrocarbon monocarboxylic acids having 18 to 72 carbon atoms, the ratio by weight of (A) to (B) being 9:1 to 1:3.

Another object is to provide such a composition in homogeneous solid solution and preferably free-flowing particulate state.

A yet further object of the invention is the development of a process for shaping thermoplastic material by incorporating from 0.1 to 5% by weight of the above lubricant composition to the thermoplastic material prior to molding.

These and other objects of the present invention will become more apparent as the description thereof proceeds.

DESCRIPTION OF THE INVENTION

The above objects have been achieved and the drawbacks of the prior art have been overcome by the development of lubricant and detackifying compositions with a content of A. mixed esters with hydroxyl and acid numbers of 0 to 6 of
  (a) aliphatic, cycloaliphatic and/or aromatic dicarboxylic acids,
  (b) aliphatic polyols,
  (c) aliphatic monocarboxylic acids with 12 to 30 carbon atoms in the molecule, and
B. esters from long-chain aliphatic monofunctional alcohols with 32 to 72 carbon atoms in the molecule and long-chain monocarboxylic acids with 18 to 72 carbon atoms in the molecule, where the weight ratio by weight of mixed esters (A) to esters (B) is 9:1 to 1:3.

More particularly, the invention involves a lubricant-detackifier composition useful in the molding of thermoplastic material comprising (A) mixed esters with hydroxyl and acid numbers of 0 to 6 of (a) alkanepolyols having 2 to 6 hydroxyl groups and 2 to 10 carbon atoms, (b) a dicarboxylic acid selected from the group consisting of aliphatic hydrocarbon dicarboxylic acids having 2 to 22 carbon atoms, cycloalkane dicarboxylic acids of 5 to 10 carbon atoms, aromatic hydrocarbon dicarboxylic acids of 8 to 14 carbon atoms, and mixtures thereof, and (c) aliphatic hydrocarbon monocarboxylic acids having 12 to 30 carbon atoms, said mixed esters having a molecular weight of at least 524, and (B) esters of aliphatic monofunctional alcohols having 32 to 72 carbon atoms and aliphatic hydrocarbon monocarboxylic acids with 18 to 72 carbon atoms, with the weight ratio of (A) to (B) being 9:1 to 1:3, as well as the process of molding the thermoplastic materials by adding from 0.1 to 5% by weight of the lubricant composition to the thermoplastic material prior to molding the same.

It has been unexpectedly found that it is possible with the above combination of (A) and (B) to achieve, with a substantially smaller amount of a mixed ester (A), a greater degree of non-stickness at normal molding temperatures than if this mixed ester (A) were used alone, even though the other esters (B) by themselves have no influence or only a very minor influence on the non-stickiness of the thermoplastic materials.

The weight ratio of the two components is critical. When the ratio of (A) to (B) is in excess of about 9:1 and less than about 1:3, the superiority of the composition disappears or nearly disappears. Accordingly, the ratio range of 9:1 to 1:3 is considered the practical range, the preferred ratio being about 4:1.

Particularly suitable combinations are those where the component (A) consists of mixed esters with hydroxyl and acid numbers of 0 to 6 of:
  (a) aliphatic, cycloaliphatic and/or aromatic dicarboxylic acids with 2 to 22 carbon atoms in the molecule,
  (b) aliphatic polyols with 2 to 6 hydroxyl groups in the molecule, and
  (c) aliphatic monocarboxylic acids with 12 to 30 carbon atoms in the molecule.

The molar ratio of dicarboxylic acids to polyol to monocarboxylic acid in mixed esters (A) can vary, and it has been found preferable for obtaining products with the desired properties to maintain a ratio of dicarboxylic acid to polyol to monocarboxylic acid of $(n-1):n:nm-2(n-1)$. In this ratio, n denotes an integer of from 2 to 11, and m which represents the functionality of the polyol used is thereby an integer of from 2 to 6. A slight deviation from the ratios is possible as long as mixed esters obtained are those whose hydroxyl and/or acid numbers do not exceed the value 6. The value of n determines also to a great extent the character of the mixed esters, since lower molecular products are obtained with lower values of n and since higher molecular products are obtained with higher values of n.

Particularly suitable as mixed esters of (A) are those based on adipic acid, pentaerythritol and stearic acid or oleic acid, in which the ratio of adipic acid to pentaerythritol to stearic/oleic acid is $(n-1):n:4n-2(n-1)$, where n represents in the case of stearic acid an integer of 2 to 8 and in the case of oleic acid an integer of 2 to 7. Preferred products have in the case of stearic acid, for example, a ratio of the mixed ester components adipic acid:pentaerythritol:stearic acid of 1:2:6 or 2:3:8 or 4:5:12 or 6:7:16 or 7:8:18; and in the case of oleic acid the preferred products have, for example, a ratio of adipic acid:pentaerythritol:oleic acid of 1:2:6 or 3:4:10 or 5:6:14.

The production of the mixed esters to be utilized according to the invention is effected according to known esterification methods; for example, the long-chain aliphatic monocarboxylic acids are esterified with bifunctional or polyfunctional polyols that the partial ester obtained still contains one or several free hydroxyl groups. Then, these hydroxyl groups are reacted with the corresponding dicarboxylic acids. Another process embodiment includes first esterifying a part of the hydroxyl groups of a polyol with a dicarboxylic acid and then reacting the remaining free hydroxyl groups of the partial ester obtained with longer-chain aliphatic monocarboxylic acids. The starting materials can be used in different quantitative ratios for the production of the mixed esters, provided that the total numbers of the carboxyl groups and of the hydroxyl groups in the starting materials are the same. The mixed esters obtained according to this invention then contain practically no free carboxyl and/or hydroxyl groups and have hydroxyl and acid numbers of 0 to 6.

In the simplest case, 1 mol of a dicarboxylic acid, 2 mols of an m-functional polyol and 2m-2 mols of a monocarboxylic acid are esterified, for example, in known manner, preferably in two esterification stages. Two process embodiments are possible. In the first process embodiment, 1 mol of a dicarboxylic acid is esterified in the first stage with 2 mols of the polyol to such an extent that the acid number is practically zero. Subsequently, the product is esterified in the second state with the stoichiometrically required amount of monocarboxylic acid to such an extent that practically no free hydroxyl groups and carboxyl groups are present any longer, that is, both the OH-number and the acid number range between 0 to 6.

In the second process embodiment, 2 mols of m-functional polyol are esterified with 2m-2 mols of a long-chain monocarboxylic acid in the first stage until the acid number is practically zero. Then the esterification is completed in a second stage with 1 mol of a dicarboxylic acid until the mixed ester obtained contains no free hydroxyl groups and carboxyl groups, that is, both its OH-number and acid number range between 0 to 6. Furthermore, it is also possible to effect the formation of the mixed ester from the starting components in a single-stage process.

Among the mixed esters that can be used according to the invention are high molecular products as well as the low molecular products produced as described above. These high molecular products can be produced by selecting as a molar ratio of the polyol to the dicarboxylic acid a ratio of less than 2:1, but not less than 1:1, for example, 5:4 or 7:6. The excess of hydroxyl groups remaining after the polyester formation of these components is esterified by an equivalent amount of saturated or unsaturated long-chain monocarboxylic acids or of a mixture of long-chain monocarboxylic acids, so that mixed esters are again formed which have practically no free hydroxyl and carboxyl groups. In this case, the esterification reaction of the starting components can also be carried out either in a two-stage or in a single-stage process. These high-molecular mixed polyesters have an extremely low vapor pressure at the processing temperatures customary for the molding of thermoplastic compounds. For this reason, these mixed esters are particularly valuable.

Suitable starting materials for the production of the component (A) according to the invention (both the lower molecular weight mixed esters and the hither molecular weight mixed esters) are listed below.

Suitable examples of dicarboxylic acids of 2 to 22 carbon atoms include saturated and unsaturated aliphatic hydrocarbon dicarboxylic acids of 2 to 22 carbon atoms; for example, alkanedioic acids of 2 to 22 carbon atoms such as oxalic acid, malonic acid, succinic acid, glutaric acid, adipic acid, pimelic acid, suberic acid, azelaic acid, sebacic acid, nonanedioic acid, undecanedioic acid and eicosanedioic acid; and alkenedioic acids of 4 to 22 carbon atoms such as maleic acid, fumaric acid, citraconic acid, mesaconic acid and itaconic acid. Other suitable examples of dicarboxylic acids include cycloaliphatic-dicarboxylic acids of 5 to 10 carbon atoms, for example, cycloalkanedioic acids of 5 to 10 carbon atoms, such as cyclopropane-dicarboxylic acid, cyclobutane-dicarboxylic acid, cyclopentane-dicarboxylic acid, camphoric acid and hexahydrophthalic acid, as well as aromatic hydrocarbon dicarboxylic acids of 8 to 14 carbon atoms, for example, mononuclear aromatic dicarboxylic acids such as phthalic acid, terephthalic acid and isophthalic acid, and for example, dinuclear aromatic dicarboxylic acids such as naphthalic acid and diphenyl-o,o'-dicarboxylic acid.

Suitable examples of polyol components for the production of the mixed esters include alkanepolyols having 2 to 6 hydroxyl groups and 2 to 10 carbon atoms such as alkanediols of 2 to 10 carbon atoms such as ethylene glycol, 1,2- and 1,3-propylene glycol, 1,4-butanediol, 2,3-butanediol, 1,5-pentanediol and 1,6-hexanediol, as well as alkanetriols of 3 to 10 carbon atoms such as glycerin and trimethylol propane, alkanetetrols of 4 to 10 carbon atoms such as erythritol and pentaerythritol, alkanepentols of 5 to 10 carbon atoms such as xylitol, and alkanehexols of 6 to 10 carbon atoms such as mannitol, sorbitol and dipentaerythritol.

Suitable examples of long-chain aliphatic monocarboxylic acids of 12 to 30 carbon atoms useful for the production of mixed esters according to the invention include alkanoic acids of 12 to 30 carbon atoms, such as lauric acid, tridecylic acid, myristic acid, palmitic acid, margaric acid, stearic acid, arachic acid, eicosanecarboxylic acid, behenic acid, lignoceric acid, cerotic acid; hydroxyalkanoic acids of 12 to 30 carbon atoms such as 12-hydroxy stearic acid, alkenoic acids of 12 to 30 carbon atoms such as oleic acid, elaidic acid, erucic acid and montanic acid, hydroxyalkenoic acids of 12 to 30 carbon atoms such as ricinoleic acid; alkadienoic acids of 12 to 30 carbon atoms such as linoleic acid; alkatrienic acids of 12 to 30 carbon atoms such as linolenic acid; as well as mixtures of fatty acid fractions of 12 to 20 carbon atoms which are obtainable from natural fats and oils, for example, fatty acid mixtures from olive oil, rape seed oil, coconut oil, palm oil, soybean oil, cottonseed oil and linseed oil.

The products to be used as mixed ester component (A) vary in their state of matter from oily liquids to hard waxes. These differences in their consistency at room temperature result, however, in no differences in their action.

The physical consistency of the product at room temperature is not established by the molecular weight, as is the case of monocarboxylic acid esters of a simple structure. In addition, the particular dicarboxylic acid or polyol likewise has no essential effect on the physical consistency at room temperature of the mixed ester according to the invention. However, of great importance in determining the melting point is whether the long-chain monocarboxylic acids used are primarily of a saturated or of an unsaturated nature. Mixed esters which exclusively contain as a monocarboxylic acid component, saturated aliphatic monocarboxylic acids with 32 to 72 carbon atoms, are solid, hard waxes with melting points of above 50° C. On the other hand, if one were to use for the production of the mixed esters as a monocarboxylic acid component, unsaturated aliphatic monocarboxylic acids with 12 to 30 carbon atoms, or monocarboxylic acid mixtures with substantially unsaturated portions, the resulting ester products would be oily liquids at room temperature and would have solidifying points below 0° C. Thus, for example, a mixed ester of adipic acid, pentaerythritol and oleic acid has a solidifying point of $-33°$ C., while a mixed ester of a similar structure whose monocarboxylic acid component is not oleic acid but is a partly unsaturated fatty acid mixture of the chain lengths $C_{16}$ to $C_{18}$ with an iodine number of 50, has a solidifying point of $-15°$ C.

In practical use, the mixed esters of adipic acid, pentaerythritol and long-chain monocarboxylic acids with 12 to 30 carbon atoms, particularly stearic acid and oleic acid, have proved preferable as component (A). Of particular importance are the higher molecular mixed esters based upon the above-mentioned three starting materials. The molecular weight of these mixed esters is at least 524, but preferably above 2,000.

The second component (B) of the combination, according to the invention, consists of esters of long-chain $C_{32-72}$ aliphatic alcohols and long chain monocarboxylic $C_{18-72}$ acids.

Examples of suitable long-chain $C_{32-72}$ aliphatic monofunctional alcohols for the production of esters (B) include alkanols of 32 to 72 carbon atoms such as:

dotriacontanol ($C_{32}$)

tetratriacontanol ($C_{34}$)
pentatriacontanol ($C_{35}$)
tetraacontanol ($C_{40}$)
tetratetraacontanol ($C_{44}$)
dopentaacontanol ($C_{52}$)
tetrahexaacontanol ($C_{64}$)
dohexaacontanol ($C_{72}$)

and mixtures thereof. The alcohols, therefore, may be saturated or unsaturated, and may be straight or branched chain.

Suitable examples of long-chain aliphatic monocarboxylic acids of 18 to 72 carbon atoms useful for the production of the above esters are oleic acid ($C_{18}$), stearic acid ($C_{18}$), behenic acid ($C_{22}$), lignocenic acid ($C_{24}$), erucic acid ($C_{22}$), cerotic acid ($C_{26}$), dotriacontanoic acid ($C_{32}$), hexatriacontanoic acid ($C_{36}$), tetraacontanoic acid ($C_{40}$), tetratetraacontanoic acid ($C_{44}$), tetrahexaacontanoic acid ($C_{64}$), and doheptaacontanoic acid ($C_{72}$).

Suitable esters for use as (B), therefore, include:

dotriacontyl oleate
dotriacontyl stearate p0 tetratriacontyl oleate
tetraaconyl stearate
tetratetraacontyl oleate
tetrahexaacontyl oleate
tetrahexaacontyl adipate
tetrahexaacontyl stearate
dohexaacontyl oleate, and
dohexaacontyl stearate.

Like the alcohols, the acids may be saturated or unsaturated.

The esters thus may be composed of the esterification product of an unsaturated $C_{32-72}$ alcohol with a saturated $C_{18-72}$ acid or vice versa; they may be the esterification products of an unsaturated $C_{32-72}$ alcohol with an unsaturated $C_{18-72}$ acid or the esterification product of a saturated $C_{32-72}$ alcohol with a saturated $C_{18-72}$ monocarboxylic acid. Pure alcohols and acids are not necessary and they may be formed by esterifying crude alcohols with crude acids of the above description, and so may be mixtures of many single esters. Branched chain analogues of both the alcohols and acids may be substituted for the straight chain compounds described above.

The esters to be used as a second component for the lubricant combination according to the invention can be solid or liquid at room temperature. Preferably, the alcohols and/or the acids used for formation of the esters are selected so that the molecular weight of the esters does not exceed above 1,500.

It has been found preferable in putting together the lubricant combinations according to the invention to utilize components (A) and (B) which are both solid at room temperature, or which are both liquid at room temperature. The products used as a first component should have the property of being miscible in any desired ratio when combined in the melt, so that homogeneous mixtures of the components are produced.

As mentioned above, the mixed esters to be used according to the invention as a component (A) are particularly effective when their molecular weight is greater than 2,000. These products, due to their high molecular weight, are obtained in the form of a highly viscous melt whose purification by bleaching, filtering, etc., is very difficult. It was found that the purification of the higher molecular weight mixed esters is substantially facilitated when an ester serving as a second component (B) is added immediately after the production of the mixed ester and before it is purified. The combination is then purified in known manner, and the result is a substantially lighter colored product than would be obtained if the mixed ester were subjected to purification by itself. Furthermore, it is possible, by adding a liquid ester serving as a second component, to considerably reduce the viscosity of the lubricant combination according to the invention, if this is desired for processing reasons, for example, if the lubricant combination is to be readily pumpable.

All the lubricant-detackifier combinations according to the invention are suitable for use in thermoplastic molding compounds, whether they are polymers, polycondensates or polyaddition products. The compositions according to the invention are particularly suitable for use with chlorinated polymers such as polyvinyl chloride, polyvinylidene chloride, as well as copolymers derived therefrom. Moreover, the compositions according to the invention can also be advantageously incorporated into other thermoplastics, such as polystyrene, polyacrylic acid esters, polymethacrylic acid esters, polyamides and polyurethanes.

The lubricant combinations according to the invention are employed in practice by adding them to the thermoplastic materials to be processed, before the processing thereof. The amount added depends on the thermoplastic material to be processed as well as on the type of processing used, and ranges between 0.01 and 5% by weight, preferably 0.05 to 0.5% by weight. After homogeneous distribution of the lubricant in the plastic, the molding can be effected in known manner. The lubricant sweats out of the molding to no more than a negligible extent.

The invention is further illustrated by the examples which follow. These examples are preferred embodiments of the invention and are not to be construed in limitation thereof.

EXAMPLE 1

The following illustrates the preparation of a preferred lubricating and detackifying agent according to the present invention.

Preparation of Component A

A mixed ester was formed from adipic acid, pentaerythritol and stearic acid by the method of Example 1 of U.S. Pat. No. 3,875,069 by esterifying 0.7 mol of pentaerythritol with 1.6 mol of stearic acid and esterifying the product with 0.6 mol of adipic acid to an acid number of 5.

Preparation of Component B

Preparation of "$C_{32}$-$C_{36}$ Oleate"

To a charge of 12,000 gm of a mixture of monobranched ($C_{32}$-$C_{36}$) alcohols obtained by the Guerbet dimerization of a mixture of $C_{16}$ and $C_{18}$ alcohols produced commercially were added 6,570 gm of oleic acid (Emery 233 LL grade) resulting in a mol ratio of 1.03 oleic acid to 1.0 alcohol. A catalyst charge of 47.6 gm of stannous oxide was added with agitation. The charge was added to the vessel previously heated to over 70° C. A vacuum of 100 mm was applied to the vessel with the contents agitated. The temperature was raised to 200° C. whereupon the vacuum was reduced to 10 mm. A full vacuum was then applied for two hours. The vessel was cooled under nitrogen and filled off. During the heating period water was evolved and removed as it formed. The contents of the vessel were then treated with clay and filter aid to absorb impurities and then the solids removed by filtration. A total of 17,000 gm of a clear, yellow liquid was obtained after filtration. The product was a mixture of dotriacontyl and hexatriacontyl oleates.

Guerbet alcohols as herein described are prepared by procedures well known to those skilled in the art as described typically in U.S. Pat. Nos. 3,328,470, 3,860,664, 3,862,993, 3,862,994 3,864,407, 3,916,015 and 3,917,722.

Preparation of Lubricating-Detackifying Composition 100 gm of Component A were melted with 100 gm of Component B at about 75° C. The resulting homogeneous mass was cooled, chilled and ground to a free-flowing powder.

EXAMPLE 2

The following illustrates the superior lubricating and detackifying properties of a preferred composition of the present invention.

100 gm of a commercial polyvinyl chloride molding powder containing essentially 100% by weight of polyvinyl chloride ("SCC Polymer" manufactured by Stauffer Chemical Co.), 3.0 gm of dibutyl tin mercaptide (a commercial tin stabilizer therefor [known as "T-31"], a product of the M & T Co., Rahway, N.J.), and 0.25 gm of the lubricant-detackifying agent of Example 1 were blended together and milled on a two-roll laboratory mill (roll speed 30 r.p.m.; roll surface temperature 300° F.; roll nip gap 0.023") until homogeneous after which the composition was ground to a powder.

Run 1 (Illustrating the present invention)

The fusion time of the product (an index of its lubricating properties) was determined at 160° C. and its tack resistance was determined by milling the composition on steel rolls at 300° F. and noting the number of minutes required for tack to develop.

Runs 2 to 4

For the sake of comparison, the procedure was repeated with three other compositions prepared in the same manner, except that Component B was replaced with an equal weight of the materials shown in the Table below.

The results were as follows.

TABLE I

| Run No. | Component B[1] | Minutes to Fuse[2] | Tack[3] |
|---|---|---|---|
| 1 | "C$_{32-36}$ Oleate"[4] | 1.7 | 85 |
| 2 | Tridecyl stearate | 1.2 | 70 |
| 3 | Octadecyl stearate | 1.4 | 80 |
| 4 | Stearate ester of a C$_{30}$ Guerbet alcohol | 1.4 | 80 |

[1]Composition was homogeneous blend of 50% by weight of Component A of Example 1 and 50% by Weight of Component B shown.
[2]At 160° F.
[3]At 300° F.
[4]See Example 1.

The results show that the lubricant-detackifier of the present invention is at least 21.4% better as lubricant and at least 6.25% better as anti-tack agent than the agents of the prior art.

EXAMPLE 3

The following illustrates the effect of varying the ratio of Component B to Component A on the tack resistance imparted by the composition.

The procedure of Experiment 1 was repeated, except that the proportion of Component B to Component A was varied as shown in Table II below, after which the tack-inhibiting properties of the composition were determined as shown in Example 2, except that the temperature of the mill used to determine the time to tack was increased to 350° F.

The results were as follows:

TABLE II

| No. | Component Ratio[1] A : B | | Minutes To Tack[2] |
|---|---|---|---|
| 1 | 10 | 0 | 20 |
| 2 | 9 | 1 | 20 |
| 3 | 8.5 | 1.5 | 24 |
| 4 | 8 | 2 | 26.5 |
| 5 | 7.5 | 2.5 | 20 |
| 6 | 7 | 3 | 15 |
| 7 | 6 | 4 | 15 |
| 8 | 5 | 5 | 15 |

[1]By weight
[2]At 350° F.

The results show that the optimum weight ratio of the components of the composition of the present invention is about 4:1 and that the benefits of the present invention are provided by compositions within the range 9:1 and 7.5:2.5 (equivalent to 3:1).

EXAMPLE 4

A composition prepared according to Example 1 wherein Component B was the ester of a mixture of dotriacontanol and tetratriacontanol with oleic acid was a preferred lubricating and detackifying agent.

EXAMPLE 5

A composition prepared according to Example 1, wherein Component B was the ester of tetraacontanol with stearic acid, was a preferred lubricating and detackifying agent.

What is claimed is:

1. A lubricant-antitack composition useful in the shaping of thermoplastic material, comprising a mixture of
(A) mixed esters with hydroxyl and acid numbers of 0 to 6 of
  (a) alkane polyols having 2 to 6 hydroxyl groups and 2 to 10 carbon atoms,
  (b) dicarboxylic acids selected from the group consisting of aliphatic hydrocarbon dicarboxylic acids having 2 to 22 carbon atoms, cycloalkane dicarboxylic acids of 5 to 10 carbon atoms, and aromatic hydrocarbon dicarboxylic acids of 8 to 14 carbon atoms, and
  (c) aliphatic hydrocarbon monocarboxylic acids having 12 to 30 carbon atoms, in an average molar ratio of $(n-1):n:nm-2(n-1)$, wherein n is an integer of from 2 to 11 and m is an integer of from 2 to 6, said mixed esters having a molecular weight of at least 524, and (B) esters of aliphatic monofunctional alcohols having 32 to 72 carbon atoms with aliphatic hydrocarbon monocarboxylic acids having 18 to 72 carbon atoms; the weight ratio of (A) to (B) being 9:1 to 1:3.

2. A composition according to claim 1 wherein the mixed esters of component (A) have an average molecular weight of at least 2,000.

3. A composition according to claim 1 wherein component (A) is a mixed ester of adipic acid, pentarthritol and stearic acid.

4. A composition according to claim 1 in which component (A) is a mixed ester of adipic acid, pentaerythritol and oleic acid.

5. A composition according to claim 1 wherein component (B) is the ester of a mixture of dotriacontanol and tetratriacontanol with oleic acid.

6. A composition according to claim 1 wherein component (B) is the ester of tetraacontanol with stearic acid.

7. A composition according to claim 1 wherein component (B) has a molecular weight less than 1,500.

8. A composition according to claim 1 wherein the components are in homogeneous solid solution state.

9. A composition according to claim 8 in particulate free-flowing state.

* * * * *